April 19, 1955    L. A. SCHOTT    2,706,384
DIRECT DRIVE VARIABLE RATIO HYDRAULIC TRANSMISSION
OF THE AUTOMATIC OR MANUAL TYPE
Filed Sept. 29, 1950    3 Sheets-Sheet 1
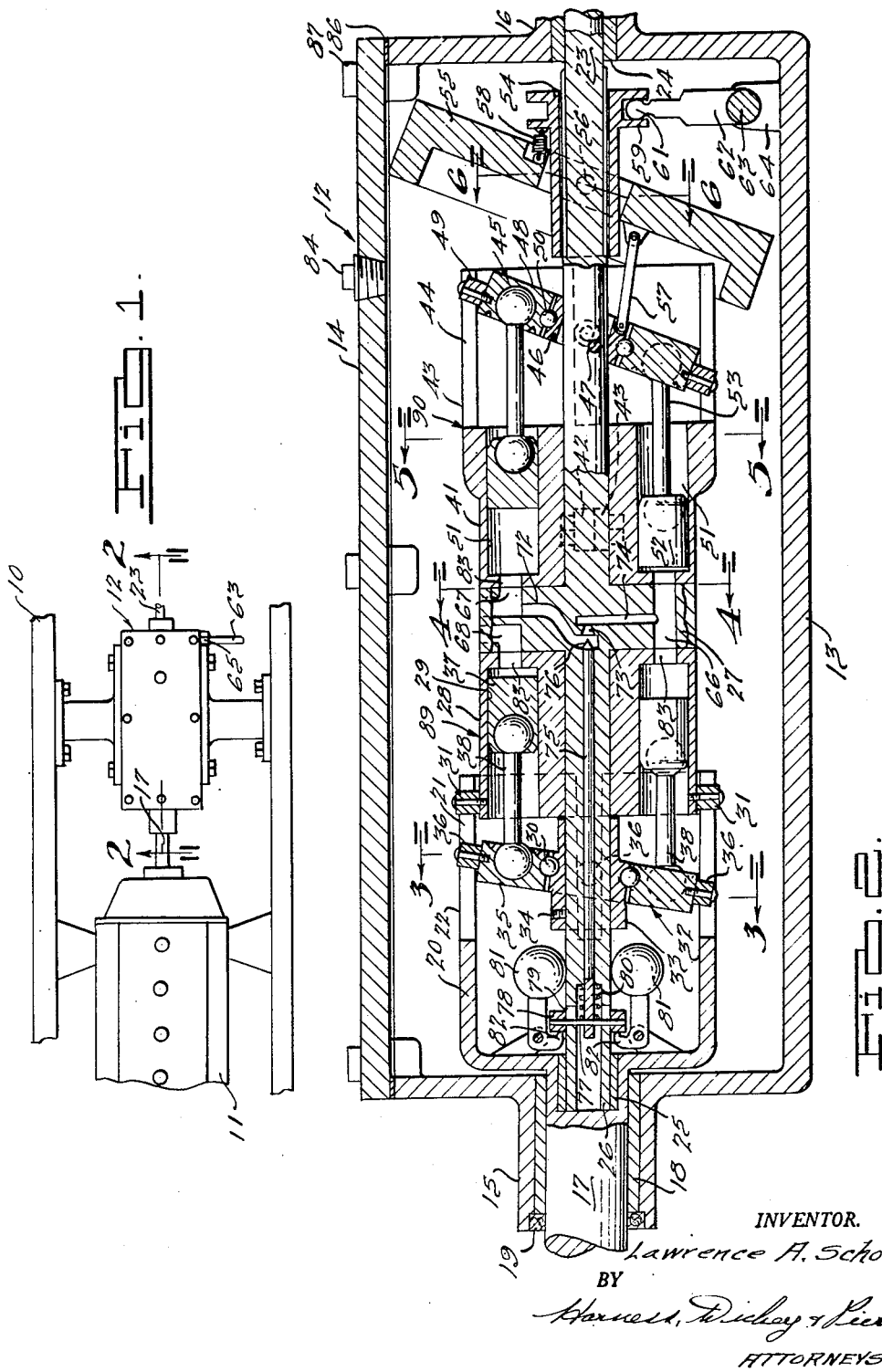
INVENTOR.
Lawrence A. Schott
BY
Harness, Dickey & Pierce
ATTORNEYS.

April 19, 1955  L. A. SCHOTT  2,706,384
DIRECT DRIVE VARIABLE RATIO HYDRAULIC TRANSMISSION
OF THE AUTOMATIC OR MANUAL TYPE
Filed Sept. 29, 1950  3 Sheets-Sheet 2
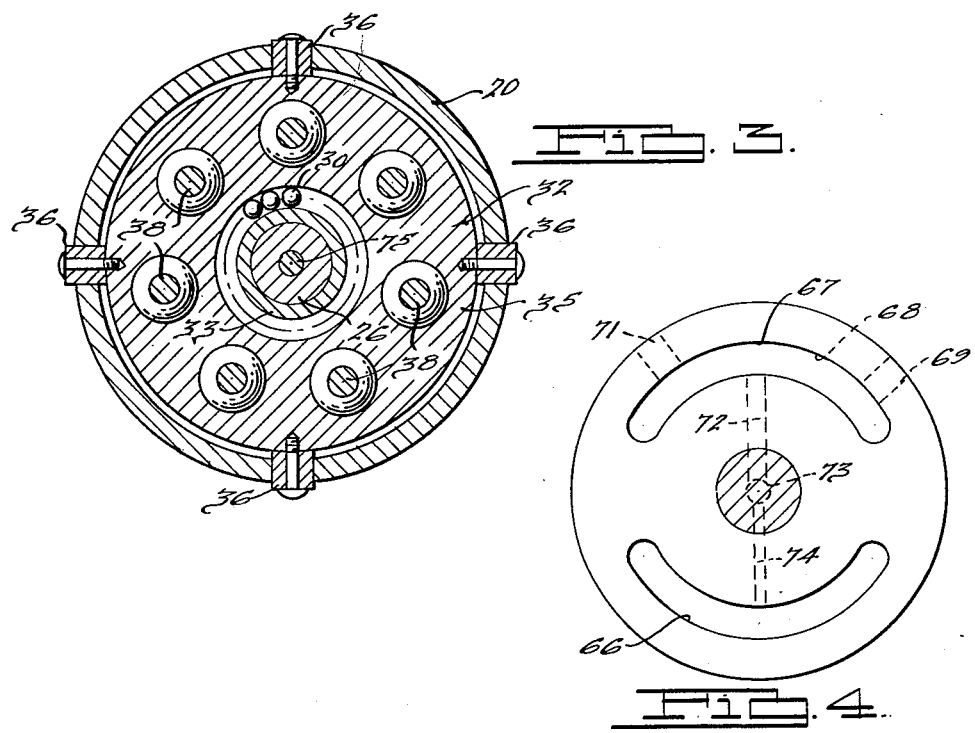
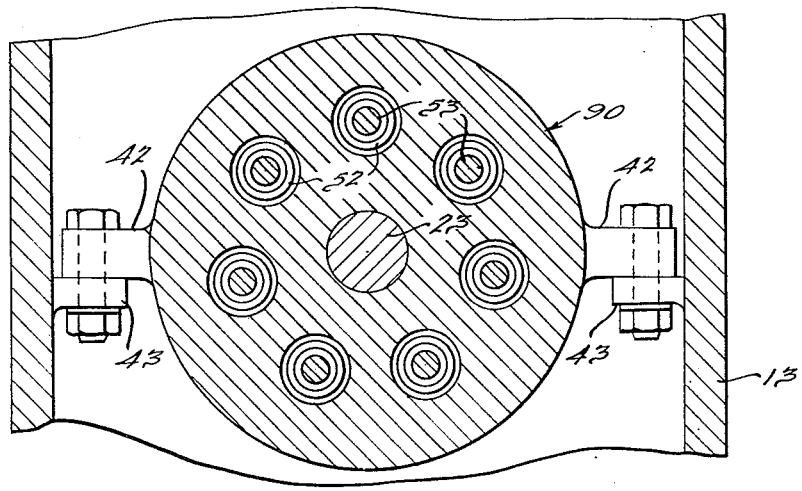
INVENTOR.
Lawrence A. Schott.
BY
Harness, Dickey & Pierce
ATTORNEYS.

April 19, 1955 L. A. SCHOTT 2,706,384
DIRECT DRIVE VARIABLE RATIO HYDRAULIC TRANSMISSION
OF THE AUTOMATIC OR MANUAL TYPE
Filed Sept. 29, 1950 3 Sheets-Sheet 3
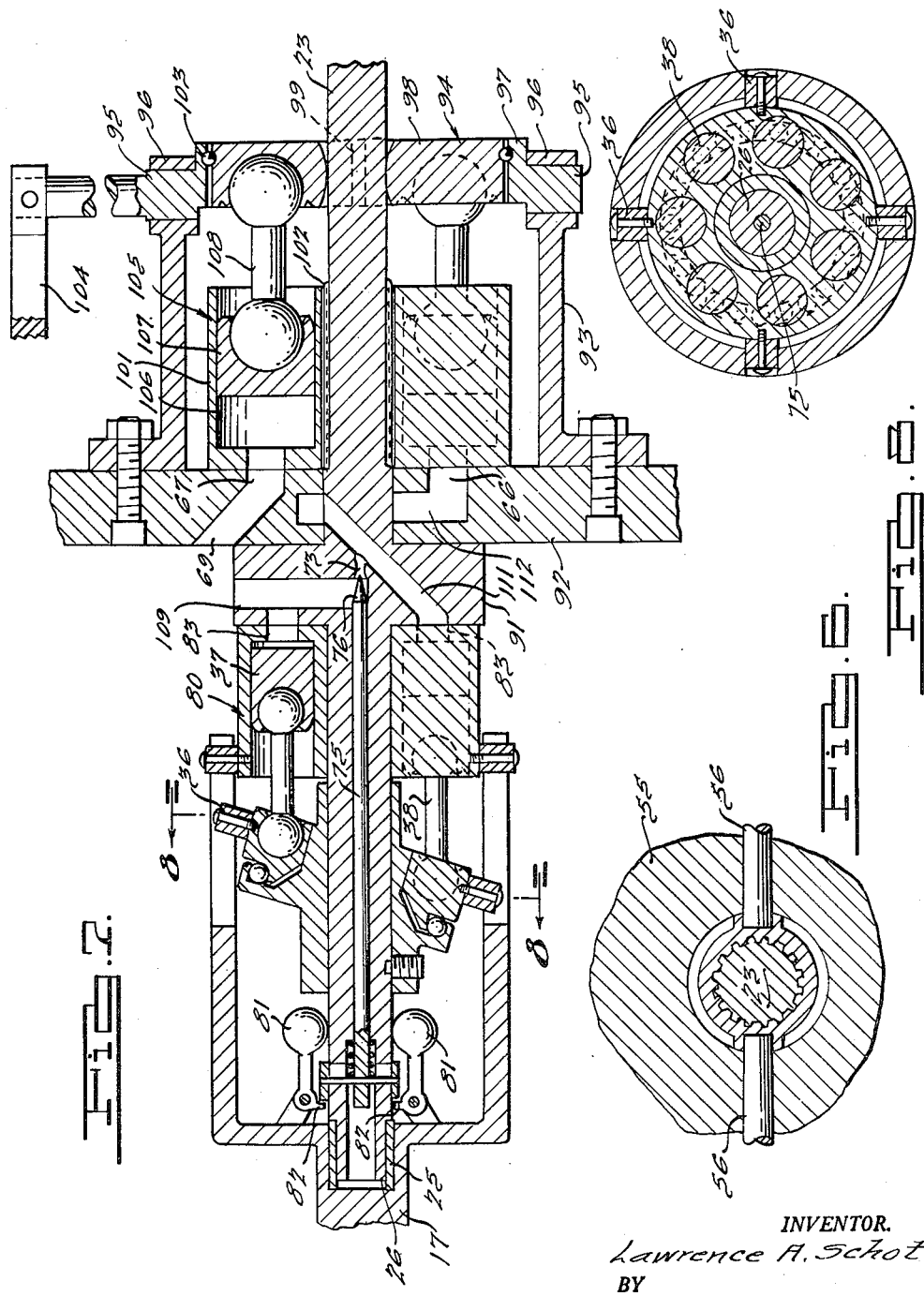
INVENTOR.
Lawrence A. Schott
BY
Harness, Dickey & Pierce
ATTORNEYS

United States Patent Office 2,706,384
Patented Apr. 19, 1955

2,706,384

DIRECT DRIVE VARIABLE RATIO HYDRAULIC TRANSMISSION OF THE AUTOMATIC OR MANUAL TYPE

Lawrence A. Schott, Detroit, Mich., assignor to Schott Transmission Co., a corporation of Michigan Application September 29, 1950, Serial No. 187,434

3 Claims. (Cl. 60—53)

This invention relates to transmissions, and particularly to a transmission of the fluid type.

The invention relates in particular to a hydraulic transmission which provides a variation of torque between the driving and driven shafts which varies from a maximum ratio to a direct drive without any feel of change of shift in the mechanism. The transmission is of such construction that as the torque requirement changes the speed and torque output changes and the resulting change occurs gradually and uniformly. As the torque requirement decreases and the speed increases, the difference in speed between the two shafts gradually decreases to zero and the shafts will move into coupled driving relation without any fluid flowing. The hydraulic part of the transmission is employed only to provide an increase of torque when additional torque is required, thereby eliminating a flow of fluid when the shafts are directly coupled, the fluid being employed only to that degree that a change of ratio of speed and torque has occurred between the drive and driven shafts.

This change will occur automatically if provisions are made for controlling the capacity of the variable volume fluid motor, or such change can be effected manually as torque requirements change. While the invention structurally may assume various forms, by way of example the invention embodies the use of a shaft driven from a source of power which operates the propulsion means of a pump. The reactance portion of the pump is secured to a driven shaft to which the propulsion means of a variable fluid motor is secured. In this relation of elements the body of the fluid motor is secured in fixed position, and fluid from the pump is delivered to the motor through a suitable porting member.

When no pumping can occur, the shafts are directly coupled, and when increased torque is required at the driven shaft this is obtained by increasing the motor capacity from zero to the degree required. This provision of increased motor capacity permits a change in speed between the shafts which produces a degree of pumping action which is relative to the change in speed between the shafts. The fluid from the pump is delivered to the motor to apply power to the propulsion means thereof to assist in driving the shaft, thereby increasing the torque on the shaft.

The percentage of lag permitted to the driven shaft relative to the drive shaft is equal to the percentage of the capacity of the pump per turn which is provided. Thus, if 50% capacity is permitted to be delivered each rotation of the driving shaft, the driven shaft will be permitted to lag one-half turn or 50%, thus providing a 2 to 1 ratio between the shaft speeds. The fluid from the pump is directed to the motor which assists the pump in turning the driven shaft this one-half turn. It is to be understood that a fixed capacity pump may be utilized with a fixed capacity motor or a plurality thereof to provide a transmission having a fixed ratio and a direct couple drive if one motor is employed and a plurality of different fixed ratios and a direct couple drive if a plurality of motors are employed.

When the torque requirement decreases after the shafts have been operating at different speeds, the capacity of the motor may b decreased, and as the same amount of fluid from the pump cannot be supplied to the motor, the driven shaft speed will be increased and the degree of pumping will be decreased. When the variable capacity motor has been shifted to inoperative position, the pump can no longer pump and the drive and driven shafts will be operating in direct coupled relation. When the variable fluid pump is provided with torque control means for varying the requirement for fluid in proportion to the torque requirement, the change in relative speed of the drive and driven shafts will thereby occur automatically. When additional torque is required on the driven shaft slowing up the shafts, the capacity of the motor changes automatically and the pump will operate to a degree proportionate to the difference of speed of the shafts. As the torque requirement is reduced, the speed of the shafts increases, the capacity of the fluid motor is decreased, and the relative pumping action also decreases so that the speed of the driven shaft will continue to build up until it is again directly coupled with the drive shaft.

Thus, it will be noted that the invention accomplishes a change of ratio between the driving and driven shafts through the control of hydraulic fluid. As the torque requirement increases, the ratio of rotation between the shafts increases, and as the torque requirement diminishes, the ratio decreases. In the example given, this automatic change is accomplished by centrifugal means, such as flywheels, governor balls and the like, or the change may be made manually, as pointed out hereinabove.

Another effect may be produced between the two shafts when the relationship between the propulsion means thereof is changed to cause the fluid motor to function as a pump and the pump to function as a fluid motor. This produces a flow of fluid from the motor to the pump which, functioning as a motor, causes the driven shaft to operate at increased speed but at reduced torque. This occurs when the capacity of the motor after having reached zero capacity has been moved to a reverse or pumping position which, up to a certain capacity, will drive the driven shaft faster than the driving shaft, thus acting as an overdrive. This overdrive effect can be built up until the capacity of the motor, acting in reverse, equals the capacity of the pump. When the capacity of the motor acting in reverse exceeds the capacity of the pump, a reversal of rotation of the driven shaft occurs relative to the direction of rotation of the driving shaft.

The ratio between the speed of the shafts, the overdrive and the reverse operation thereof can be illustrated as follows. If the capacity of the motor is adjusted to have five times the capacity of the pump, the pump will turn five times to supply fluid to produce one turn of the motor and one turn to keep up with the motor. Thus the ratio between the driving and driven shafts will be six to one. If the motor capacity is decreased to four times the capacity of the pump, the pump will turn four times to supply fluid to produce one turn of the motor and one turn to keep up with the motor. Thus the ratio will change to five to one. This relative relationship will continue until the capacity of the motor is zero, and as the pump need not turn to supply fluid it need only turn the one turn to keep up with the motor and the ratio is one to one, at which time the shafts are in direct coupled relation.

The operation of the motor in a reverse direction subtracts from the turn required of the pump to keep up with the motor and to this degree of difference will the driven shaft increase its speed over the input shaft. This overdrive effect can be continued to a point where the capacity of the reversed motor equals that of the pump which can be indicated at the point of infinity. Going beyond the indicated infinity point, the motor will be operated by the fluid from the pump in a reverse direction with a speed depending upon the set capacity of the motor in reverse. For example, if the motor is set to full capacity in reverse at say five times the capacity of the pump, the pump must relatively rotate five times to supply the required fluid to the motor to produce one turn of the motor. Actually the pump is required to rotate only four turns, as a turn is picked up by the counteroperation of the shafts, thus producing a four to one reduction in ratio.

Initially upon starting the driving member at low speed, the system is so set that the fluid produced by the operation of the pump is by-passed to tank and no resistance is offered to pump operation. When the by-pass is shut off, the fluid builds up a pressure to a permissible amount, the reactance to which drives the shaft so that relative relationship exists between the pump revolution and shaft revolution relative to the rotation of the input shaft.

In a wobble plate type of motor, it is merely necessary to tilt the wobble plate in the opposite direction to that for direct drive to reverse the operation of the driven shaft. The volume of the motor must be larger, therefore, than the volume of the pump per revolution to cause the reversal of the propulsion means of the pump so that it will actually carry the reacting portion of the pump, and therefore the driven shaft, in a direction counter to the rotation of the input shaft.

The wobble plate on the fluid motor may be pivoted off-center relative to the driven shaft toward the side which produces thrust from the output pistons, which tends to force the wobble plate in a more angular position as the pressure increases on the piston. Thus, the ratio of supply and demand of fluid between the pump and motor tends to increase as the input torque increases, which is accomplished by increased throttle. The centrifugal force resulting from speed produced by the flywheel on the output shaft tends to straighten the wobble plate and in this manner tends to retain the driving and driven shafts in direct coupled relation. This condition may be balanced to any desired degree and will produce the effect of greater torque and increase of speed directly if more throttle is applied. When the throttle is increased, the increased power on the pistons of the fluid motor will cause its wobble plate to tilt due to the off-centered pivotal relation thereof and will counteract the flywheel which is tending to maintain the wobble plate in no-stroke position. Thus, the increase in throttle produces an increase in torque ratio which will be attempted to be overcome by the increase of centrifugal force in the flywheel. In an automobile, the increase in throttle produces an increase in torque which tends to produce an increase in speed. As the speed of the driven shaft increases, the centrifugal force of the flywheel overcomes the tilting force in the wobble plate, the wobble plate will be drawn to nonoperating position and thereby have no capacity. As a result, the pump can no longer pump fluid to the fluid motor and a lock occurs in the fluid system resulting from the fluid motor reaching no-volume capacity, and at this point the shafts are driven at the same speed directly without any fluid movement.

Accordingly, the main objects of the invention are: to provide a variable ratio hydraulic transmission which is directly coupled in such manner that it can be driven at high speed for long periods of time without developing any excess heat; to provide a transmission with a drive and driven shaft interlocked by a closed fluid system between a pump and motor when the shafts are driven at the same speed; to provide a transmission having a drive and driven shaft with a fluid system which is inoperative when the shafts are operating at the same speed and which is operative to produce a flow of fluid from the driven shaft to the drive shaft to increase the torque on the latter as the speed thereof decreases; to provide a transmission having a drive and driven shaft with a pump on the drive shaft and a variable capacity fluid motor on the driven shaft, the differential in speeds between the two shafts providing a proportional degree of operation of the pump which provides pressure to the fluid motor for increasing the torque on the driven shaft; to provide a transmission having a drive and driven shaft interconnected through a pump on the drive shaft and a variable capacity motor on the driven shaft, the capacity of the latter of which is controlled centrifugally to meet the torque requirements of the driven shaft when operating out of synchronism with the drive shaft; to provide a transmission having a drive and driven shaft interconnected through a pump and variable capacity motor, the operation of which increases with the increase in differential speed of operation between the shafts to provide increased torque to the driven shaft and which provides increased speed of the driven shaft over the drive shaft when the motor is in overdrive position and which produces a reversal of operation of the driven shaft when the fluid motor is in reverse position; and, in general, to provide a transmission which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Figure 1 is a broken, plan view of an automotive vehicle having a transmission embodying features of the present invention;

Fig. 2 is an enlarged sectional view of the transmission illustrated in Fig. 1, taken on the line 2—2 thereof;

Fig. 3 is an enlarged sectional view of the structure illustrated in Fig. 2, taken on the line 3—3 thereof;

Fig. 4 is an enlarged sectional view of the structure illustrated in Fig. 2, taken on the line 4—4 thereof;

Fig. 5 is an enlarged sectional view of the structure illustrated in Fig. 2, taken on the line 5—5 thereof;

Fig. 6 is an enlarged sectional view of the structure illustrated in Fig. 2, taken on the line 6—6 thereof;

Fig. 7 is a view of structure, similar to that illustrated in Fig. 2, showing a further form which the invention may assume, and Fig. 8 is a sectional view of the structure illustrated in Fig. 7, taken on the line 8—8 thereof.

Referring to Figs. 1 to 7, the transmission of the present invention is illustrated in Fig. 1 as being applied to an automobile. It is to be understood that the application of the transmission to an automobile and the specific structure employed in the transmissions is illustrated by way of example, as the transmission may be employed for many other applications and the form thereof may vary substantially from that herein described. A chassis frame 10 is of the conventional type, having an engine 11 supported thereon for operating through the transmission 12 of the present invention.

The transmission 12, as illustrated in Figs. 2–6 inclusive, comprises a casing 13 having a removable cover 14 and bosses 15 and 16 at the opposite ends. A drive shaft 17 is journaled in a bearing 18 in the boss 15, sealed against the passage of fluid from the inside of the casing 13 by a sealing element 19. The shaft has a cuplike end 20 disposed within the casing, having four slots 21 in the cylindrical, inwardly extending wall 22 thereof. A driven shaft 23 is supported by bearings 24 in the boss 16 at the opposite end of the casing from the drive shaft 17 in alignment therewith. A bearing 25 is provided on the inner end of the drive shaft 17 in which the forward end 26 of the driven shaft 23 is supported. Medially of the ends of the shafts, a valve plate 27 is disposed in fixed relation therewith.

The forward end of the drive shaft 23 has a barrel 28 of a pump 89 mounted for rotation relative thereto. The barrel is provided with a plurality of cylinders 29 which are herein illustrated as being seven in number, but it is to be understood that any number of cylinders may be provided within the barrel. The barrel has four rollers 31 secured on the outer periphery thereof and each located within a slot 21 of the cup 20 on the drive shaft 17. A swash plate 32 is mounted on the forward end of the shaft 23, having an inner element 33 fixed to the shaft 23 by suitable means herein illustrated as by setscrews 34. The outer element 35 of the swash plate has four rollers 36 secured to the outer peripheral surface thereof, each located within a slot 21 of the cup 20. A piston 37 is mounted for reciprocation in each one of the cylinders 29 of the barrel 28, having ball-ended connecting rods 38 connected to the piston 37 and the outer element 35 of the swash plate 32 in the conventional manner. The inner and outer elements 33 and 35 are connected in drive relation by balls 30 or other suitable means to transfer the reactive thrust of the pump to the shaft 23. The location of the rollers 31 and 36 within the slots 21 produces the synchronized rotation of the swash plate element 35 and the barrel 28 relative to the shaft 23.

A barrel 41 of a motor 90 is mounted for rotation on the rearward end of the shaft 23 on the opposite side of the valve plate 27 from that of the barrel 28. The barrel is secured by a pair of arms 42 to a boss 43 on each side of the casing 13. The barrel 41 has a cylindrical portion 43 extending therefrom, provided with four slots 44. The inner element 46 of the swash plate 45 is secured to the shaft 23 by a pivot 47 which may be located on the center of the shaft but which is herein illustrated as being disposed in off-center relation therewith, for a purpose to be hereinafter described. The outer element 48 of the swash plate 45 is provided with four rollers 49 on the outer peripheral face thereof which operate in a slot 44 of the cylindrical extension 43 of the barrel 41. The interconnection of the rollers 49 in the slots 44 retains the outer element 48 of the swash plate 45 from rotating so as to be maintained in alignment with the fixed barrel 41. The barrel 41 contains a plurality of cylinders 51, herein illustrated as being seven in number, although any number of cylinders may be utilized which may be of the same or greater capacity than the cylinders 29 of the barrel 28. Each of the cylinders contains a piston 52 which is interconnected by ball-ended connecting rods 53 to the element 48 of the swash plate 45 in the conventional manner. The inner and outer elements 46 and 48 are interconnected by balls 50 or other suitable means to be in driving relation to each other. Thus, it will be seen that the barrel 41 is retained in fixed relation to the casing and that the swash plate 48 is retained in fixed relation to the barrel.

A sleeve 54 is splined to the rearward end of the shaft 23 for rotation therewith while being shiftable longitudinally thereon. A flywheel 55 is supported by trunnions 56 on the sleeve 54. A link 57 is pivoted to the flywheel and to the inner element 46 of the swash plate 45. A spring 58 interconnects the flywheel to the sleeve 54 diametrically opposite to the connection of the link 57 of the swash plate. A pair of flanges 59 extends outwardly from the sleeve 54, providing a channel in which a roller 61 extends, the roller being mounted on an operating arm 62 mounted on an operating shaft 63 which is journaled in apertures in bosses 64. The operating rod 63 extends through the casing and through a packing gland 65 in fluid tight relation therewith.

The valve plate 27 is provided with a fluid delivery passageway 66 on one half thereof and a fluid discharge passageway 67 and a fluid intake passageway 68 on the opposite half thereof. The fluid discharge slot 67 has a discharge aperture 69 and the fluid intake slot has an intake aperture 71, the apertures 69 and 71 communicating with the interior of the casing 13. The discharge slot 67 is connected by a by-pass passageway 72 to a valve seat 73 on the center line of the shaft 23. A by-pass passageway 74 interconnects the fluid delivery passageway 66 to the seat 73. A rod 75 extends through the forward end of the shaft having a valve end 76 which is movable into engagement with the valve seat 73. The rod has its forward end secured by a pin 77 to a collar 78 mounted exteriorly of the shaft 23. The pin 77 operates within a slot 79 through the walls of the shaft. A pair of flyweight ball governors 81 is mounted on the drive shaft 17 on the base of the cuplike element 20 thereof, having fingers 82 disposed in engagement with the collar 78 for moving the collar and the rod 75 toward the rear end of the shaft 23, thereby seating the end of the valve 76 on the seat 73 and cutting off the supply of oil from the delivery passageway 66 to the discharge passageway 67. A spring 80 about the rod 75 retains the valve end 76 unseated and the governor 81 inoperative. Each cylinder 29 of the barrel 28 and each cylinder 51 of the barrel 41 has a passageway 83 at the end thereof which is relatively movable into and out of engagement of the passageways 66, 67 and 68, respectively. A fill plug 84 is provided in the cover 14 of the casing so that the casing may be maintained full of fluid after the cover is secured in sealed relation with the casing 13 by the gasket 86 and the plurality of screws 87. The casing 13 is filled with a desirable fluid through the fill plug 84, and the transmission is then in condition for operation. For the purpose of illustration, the valve 27 is shown offset from normal position. The outward movement of the pistons 37 should occur at the end of the slot 67, but not at the center thereof, as shown.

Assuming the transmission to be employed on an automobile, when the engine 11 is started, the spring 80 retains the flyballs in inoperative position at idling engine speed. When the speed of the engine 11 increases, the flyballs overcome the tension of the spring 80 and start to seat the valve end 76. When the valve end is unseated during the idling of the engine, the shaft 17 is rotating and the shaft 23 remains stationary. This permits the barrel 28 and wobble plate 32 to rotate relative to the shaft 23 and the wobble element 33, thereby producing a pumping operation conforming to the speed of the drive shaft 17. The pistons 37, when in pumping position, discharge the fluid from the passageway 83 into the passageway 66 where it passes into the by-pass passageway 74 through the valve seat 73 to the bypass passageway 72 to the discharge passageway 67 and the discharge aperture 69. In this manner, when the engine is idling, the pump is operating at the speed of the drive shaft, but is producing no driving force to the automobile as the fluid is directly by-passed back into the case.

When the speed of the engine increases and the valve seat 73 is being closed by the valve 76 due to the operation of the centrifugal device 81, the reaction to the pump by the restriction to the flow of oil reacts on the driven shaft to produce its rotation. When the valve 76 reaches closed position, the fluid can no longer be by-passed and is directed from the passageway 83 of the pump to the passageway 66 of the valve into the passageway 83 of the motor. This produces a driving operation of the motor to an amount depending upon the degree of torque requirement on the shaft 23, and as the torque requirement decreases, the speed of rotation of the shaft 23 will pick up until it reaches the same speed as the drive shaft 17 and the shafts will operate in direct coupled relation. This occurs by reason of the fact that the pumping of the fluid into the motor provides a drive force to the shaft 23 by the motor, the reactance to which applies a force back through the pump, which also produces a driving relation on the shaft 23. As the speed of the shaft 23 increases, the centrifugal force of the flywheel 33 will reduce the capacity of the motor which will apply a further resistance to the operation of the pump, the reaction to which will further increase the speed of the shaft 23, and if the torque load permits the shaft 23 to continue to build up speed, the wobble plate 45 will be moved to neutral position so that the motor can no longer function, the pump can no longer pump and the two shafts will be operated at the same speed interlocked by the inability of the fluid to pass from the pump to the motor.

Should the torque requirement of the driven shaft thereafter increase, the operation of both shafts will slow down, the flywheel will tilt and shift the wobble plate of the motor to provide capacity thereto, and the pump will start operation to provide fluid to the motor as the driven shaft slows down. The fluid from the pump delivered to the motor adds torque to the shaft 23, and if the shaft should further slow down due to the reduction in centrifugal force in the flywheel, the flywheel will be shifted by the spring 58 and the wobble plate 45 of the motor will be further shifted to further increase the motor capacity, the speed of the pump will be increased to supply fluid to the motor, which will add additional torque to the shaft 23 until a balanced condition is reached.

When the torque requirement on the shaft 23 is reduced, the speed of both shafts increases, increasing the centrifugal force of the flywheel 55 which operates to decrease the capacity of the motor, thereby forcing the fluid being pumped to react on the driven shaft to increase its speed, and as the speed of the driven shaft continues to increase as the torque requirement decreases, it will again become directly coupled with the drive shaft 17.

When a reverse operation of the shaft 23 is desired, the operating rod 63 is actuated to move the arm 62 and shift the sleeve 54 toward the rear end of the shaft 23, thereby reversing the slope of the wobble plate 45 and thereby reversing the action of the motor 90 when the capacity of the motor 90 is greater than that of the pump to cause the shaft 23 to operate in a reverse direction. In between the neutral position of the wobble plate 45 and its reverse position, an overdrive position obtains in a manner as pointed out hereinabove. The action above described occurs when the wobble plate element 45 is pivoted to the shaft 23 on the center line or when pivoted off-center thereof, as illustrated. When in off-center relation, an advantage is provided in that when the speed of the engine 11 is increased the increased supply of fluid from the pump 80 produces increased thrust on the piston of the motor 90 and the differential between the length of arm of the wobble plate element 46 and each side of the center of the shaft 23 tends to shift the wobble plate into a greater angular position and thereby apply an additional torque to the shaft 23. The flywheel tends to counterbalance the tilting effect produced on the wobble plate due to the increased speed of the shaft 23, thereby tending to bring the wobble plate to neutral position and the shafts in direct coupled relation. Thus, a greater torque can be applied to the shaft 23 through increasing the speed of the engine; that is to say, the same speed of driving of the automobile will be obtained by increasing the speed of the engine which will produce an increased speed of the drive shaft 17 over the shaft 23 and start operation of the pump 80 and the motor 90 until the torque requirement is overcome, at which time the engine speed can be reduced to have the shafts again run at the same speed or the shaft 23 will pick up additional speed to operate the automobile faster when the shafts are again running at the same speed due to the decrease of torque requirement.

Referring to Fig. 7, a different arrangement of the parts of the motor and pump is illustrated to show the possibility of employing different constructions, not only when utilizing the wobble type of pump and motor, but it is to be understood that different types of pump and motor may be employed and advantages provided thereby. In the illustrated construction, the fluid pump 80 is substantially the same as that illustrated in Figs. 2 to 6. A portion of a valve plate 91 is mounted to the driven shaft 23, the other part 92 thereof being fixed to the casing 13 (not shown in Fig. 7). A cylindrical bracket 93 extends rearwardly from the plate 92 and is utilized for supporting a wobble plate 94 thereon by a pair of trunnions 95 which are journaled in bearings 96 on the element 93. The trunnions are secured to the outer element 97 of the wobble plate 94, the inner element 98 of which is secured to the shaft 23 by a key 99, a universal joint or other connection which provides a drive connection therebetween while permitting the element 98 to rock relative to the shaft 23. A barrel 101 is secured to the shaft 23 by splines 102, so that the barrel and the element 98 of the swash plate rotate in synchronism with each other and the shaft 23. The elements 97 and 98 of the swash plate are interconnected by a plurality of ball bearings 103 or other mechanism strong enough to withstand the strain of operation. Suitable mechanism, herein illustrated as a lever 104, is employed for tilting the swash plate 94 to thereby vary the capacity of the motor 105 which embodies the barrel 101 and swash plate 94.

The barrel 101 contains a plurality of cylinders 106 in which reciprocating pistons 107 are mounted and connected by ball-ended connecting rods 108 to the swash plate element 98. The passageways 83 from the pump 89 communicate with an inlet passageway 109 on the intake side of the pump and with the discharge passageway 111 on the pressure side of the pump. The bypassing of fluid from the passageways 111 to the passageway 109 is cut off when the valve end 76 is seated on the valve seat 73. Thereafter, delivered fluid from the passageway 111 enters a cylindrical passageway 112 in the valve plate 92 from which it is delivered to a valve passageway 66 and the motor 105 from which it is discharged into the valve passageway 67 and exhausted from the discharge passageway 69 into the casing 13, not shown.

The structure illustrated in Figs. 7 and 8 operates in the same manner as the structure illustrated in Figs. 1–16, and is herein illustrated and described for the purpose of showing the use of different capacities of motors and pumps and the different arrangement of the parts. It will be noted that the barrel 101 and the inner element 98 in the wobble plate 94 rotate with the shaft 23, and that the valve plate part 92 is fixed to the casing 13. It has been pointed out hereinabove that the parts of the pump and motor may be of any form that is suitable and that the connection may be made to the shafts in any desirable manner, just so that the shafts can be directly coupled when no fluid is flowing and when fluid is flowing during the time the shafts are operating at different speeds, the fluid is utilized for applying torque to the driven shaft. The greater capacity of the motor over the capacity of the pump was found to be necessary to reverse the direction of operation of the driven shaft relative to the drive shaft when the direction of operation of the motor is reversed. It is to be understood that in the construction illustrated in Figs. 1–6, the capacity of the motor and pump may be changed, one relative to the other, to meet the specific requirement of output speed and torque.

What is claimed is:

1. In a transmission, a drive shaft, a driven shaft, a fixed capacity pump having first and second relatively movable elements secured to said drive and driven shafts and operated by the relative rotation therebetween as the driven shaft is rotated in the same direction as the drive shaft through the pump, a variable capacity fluid motor having first and second relatively movable elements disposed about said driven shaft and driven by the fluid from the pump, means interconnecting the driven means of said fluid motor to said driven shaft for driving the shaft in the same direction as said shaft is driven through the pump, fluid control means operated by said driven shaft for controlling the flow of fluid between said pump and motor, and means actuated by the drive shaft for controlling the delivery of the pump fluid to said motor when the speed of the drive shaft is increased above a predetermined speed.

2. In a transmission, a drive shaft, a driven shaft, a fixed capacity pump having first and second relatively movable elements secured to said drive and driven shafts and operated by the relative rotation therebetween as the driven shaft is rotated in the same direction as the drive shaft through the pump, a variable capacity fluid motor having first and second relatively movable elements disposed about said driven shaft and driven by the fluid from the pump, means interconnecting the driven means of said fluid motor to said driven shaft for driving the shaft in the same direction as said shaft is driven through the pump, fluid control means carried by said driven shaft for controlling the flow of fluid between said pump and motor, and means operated by the driven shaft for varying the capacity of said fluid motor.

3. In a transmission a drive shaft, a driven shaft, a fixed capacity pump having first and second relatively movable elements secured to said drive and driven shafts and operated by the relative rotation therebetween as the driven shaft is rotated in the same direction as the drive shaft through the pump, a variable capacity fluid motor having first and second relatively movable elements disposed about said driven shaft and driven by the fluid from the pump for applying torque to the driven shaft, means interconnecting the driven means of said fluid motor to said driven shaft for driving the shaft in the same direction as said shaft is driven through the pump, fluid control means carried by said driven shaft for controlling the flow of fluid between said pump and motor, centrifugal valve means operated by the drive shaft for controlling the delivery of the pump fluid to said motor, and means actuated by the driven shaft for varying the capacity of the fluid motor.

References Cited in the file of this patent

UNITED STATES PATENTS

| Number | Name | Date |
|---|---|---|
| 511,289 | Cooper et al. | Dec. 19, 1893 |
| 1,080,282 | Kellogg | Dec. 2, 1913 |
| 1,143,727 | Robson | June 22, 1915 |
| 1,552,023 | Wingquist | Sept. 1, 1925 |
| 1,787,565 | Brown | Jan. 6, 1931 |
| 1,816,735 | Magness | July 28, 1931 |
| 1,914,622 | Smith | June 20, 1933 |
| 2,016,040 | Kennedy | Oct. 1, 1935 |
| 2,114,076 | Gölz | Apr. 12, 1938 |
| 2,199,081 | Perin | Apr. 30, 1940 |
| 2,257,724 | Bennetch | Oct. 7, 1941 |
| 2,337,499 | Roth | Dec. 21, 1943 |
| 2,524,278 | Thal | Oct. 3, 1950 |
| 2,549,646 | Thomas | Apr. 17, 1951 |
| 2,570,843 | Orshansky | Oct. 9, 1951 |

FOREIGN PATENTS

| Number | Country | Date |
|---|---|---|
| 508,434 | France | July 24, 1920 |
| 42,422 | France | Apr. 25, 1933 |
| | (Add'n to No.727,482) | |